(12) United States Patent
Trevor et al.

(10) Patent No.: US 8,224,889 B2
(45) Date of Patent: Jul. 17, 2012

(54) MODERATED SYNDICATION DATA FEED

(75) Inventors: Jonathan James Trevor, Santa Clara, CA (US); Daniel Joseph Raffel, San Francisco, CA (US); Pasha Sadri, Menlo Park, CA (US); Edward Ho, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 575 days.

(21) Appl. No.: 11/611,668

(22) Filed: Dec. 15, 2006

(65) Prior Publication Data

US 2008/0147729 A1  Jun. 19, 2008

(51) Int. Cl.
*G06F 15/16* (2006.01)

(52) U.S. Cl. ........ 709/203; 709/204; 709/205; 709/206; 707/101

(58) Field of Classification Search .................. 709/203, 709/204, 205, 206; 707/101
See application file for complete search history.

(56) References Cited

U.S. PATENT DOCUMENTS

| 2006/0155698 | A1* | 7/2006 | Vayssiere | 707/6 |
| 2007/0083520 | A1* | 4/2007 | Shellen et al. | 707/10 |
| 2007/0083536 | A1* | 4/2007 | Darnell et al. | 707/101 |

OTHER PUBLICATIONS

U.S. Appl. No. 11/611,648, filed Dec. 15, 2006.

* cited by examiner

*Primary Examiner* — Karen C Tang
*Assistant Examiner* — Cheikh Ndiaye
(74) *Attorney, Agent, or Firm* — Weaver Austin Villeneuve & Sampson LLP

(57) ABSTRACT

One or more input syndication data feeds are processed to generate an adjusted syndication data feed. The input syndication data feeds are received, and include a plurality of syndication data items. Based on a configuration of a syndication feed adjuster, particular ones of the syndication data items in the received syndication data feed are determined to not be included in an output syndication data feed. The output syndication data feed is provided based on the received input syndication data feeds and a result of the determination. The determination may be provided via a user interface via which, for example, a user may indicate particular ones of the syndication data feed items to not include in the output syndication data feed. Furthermore, in some examples, if no decision has been made about a particular syndication data feed item, that syndication data feed item is not provided in the output syndication data feed.

53 Claims, 4 Drawing Sheets

MODERATED SYNDICATION DATA FEED

BACKGROUND

Subscribing to web site syndication feeds is a popular mechanism for users to receive information about web pages in an efficient manner. In general, syndication data for a web page is data that represents the content of the web page and may even be identical in content to the content of the web page, but is not itself the content of the web page. The syndication data is available to syndication-aware programs that subscribe to a "feed" of the syndication data. The syndication data is typically designed to be machine-readable for efficient processing (e.g., into human-readable form). For example, the syndication data is typically XML-based or otherwise structured to ensure or enhance the machine-readability.

A typical use of syndication data is by subscription via a syndication feed aggregation service, which combines the contents of multiple syndication feeds for display on a single screen or series of screens. Examples of syndication data include data formatted according to standards such as past, current and to-be promulgated versions of RSS and Atom. While RSS and Atom are popular syndication data formatting standards, there are (and, in high probability, will be) other standards for syndication data formatting.

The syndication feed content for a data item typically includes a human-readable description of the data item, where the human-readable description is "clickable" to the web page URL so that the user can easily view the corresponding underlying web page content. In addition, an aggregation service may operate to aggregate syndication feed content to provide to an end user. For example, this may provide a marketing mechanism for a service provider, such as a real estate agent, to keep potential clients coming back to his web site.

SUMMARY

In accordance with one aspect, one or more input syndication data feeds are processed to generate an adjusted syndication data feed. The one or more input syndication data feeds are received including a plurality of syndication data items. Based on a configuration of a syndication feed adjuster, particular ones of the syndication data items in the received syndication data feed are determined to not be included in an output syndication data feed. The output syndication data feed is provided based on the received one or more input syndication data feeds and a result of the determination.

The determination may be provided via a user interface via which, for example, a user may indicate particular ones of the syndication data feed items to not include in the output syndication data feed. Furthermore, in some examples, if no decision has been indicated about a particular syndication data feed item, that syndication data feed item is not provided in the output syndication data feed.

DETAILED DESCRIPTION

The inventors have realized that it may be desirable for a syndication data feed aggregator (or, for that matter, even a presenter of a single syndication data feed) to have the capability to filter the syndication data feed that is being presented. For example, a teacher may have configured a syndication data feed aggregation for use by his students and, the teacher may want to keep "questionable" content from reaching the students via the syndication data feed aggregation.

Figure 1:
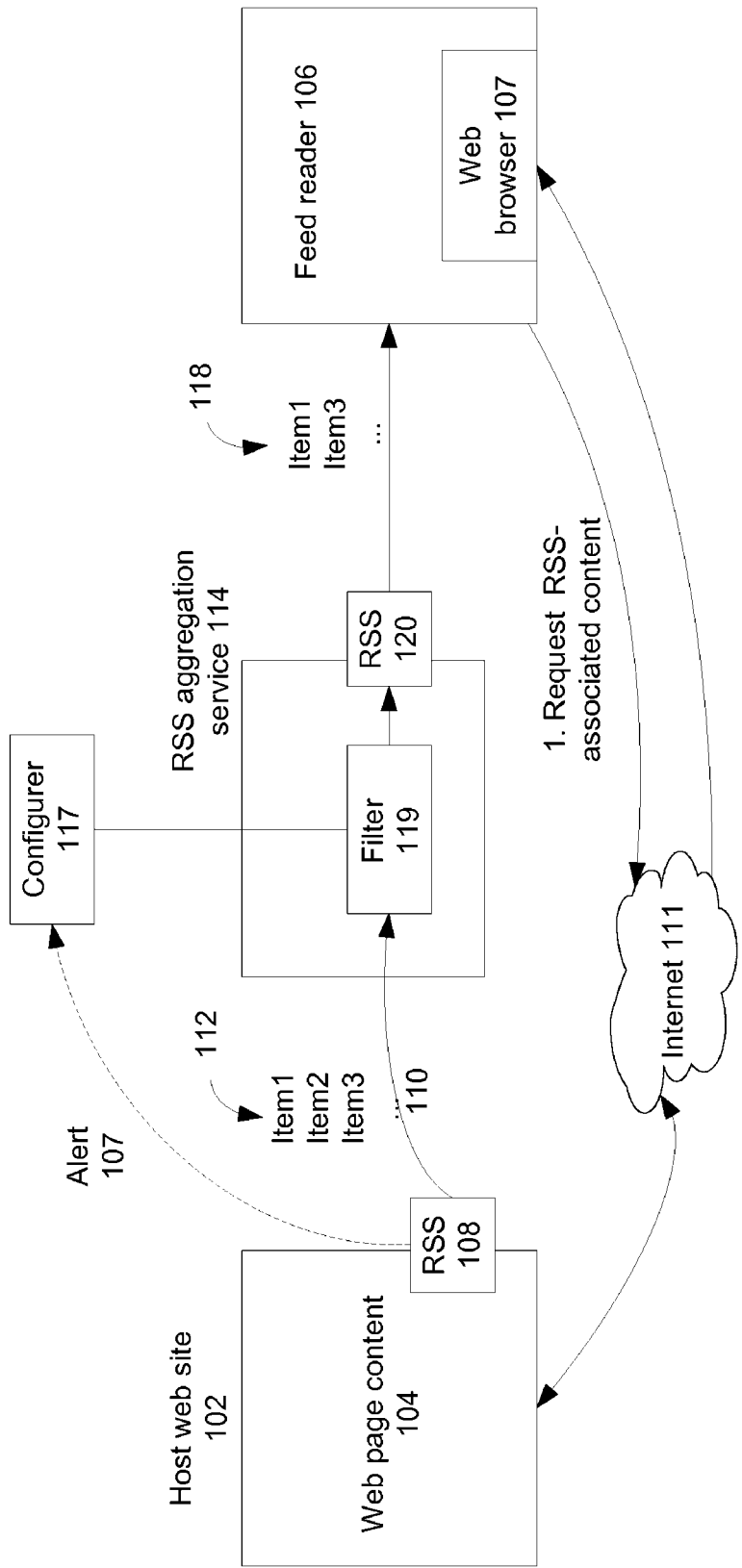
FIG. 1 is a block diagram illustrating an example architecture of a system in which an aggregation service includes a filter that may be configured to keep particular syndication feed data items from being provided to a user of the aggregation service.

In accordance with an example, the aggregation service includes a filter that may be configured to keep particular syndication feed data items from being provided to a user of the aggregation service. FIG. 1 is a block diagram illustrating an example architecture of such a system. Referring to FIG. 1, a host web site 102 is configured to provide web content 104 based on a request from, for example, a web browser program 106. While FIG. 1 illustrates a single host web site 102, in a typical configuration, the system may include more (even many more) than a single host web site 102 configured to provide web content to the web browser program 106. A single host web site 102 is shown for simplicity of illustration only.

The host web site 102 has associated with it an RSS syndication data output 108 (which, more generically, includes functionality to cause a syndication data feed to be provided). The RSS syndication output 108 operates to cause an RSS feed 110 to be provided to an RSS aggregation service 114. In particular, the RSS feed 110 comprises a structured representation of the web page content 104, including items 112 (in FIG. 1, item1, item2 and item3). The items 112 are usable, for example, to form a request for particular portions of the web page content 104.

The RSS feed items 112 received by the aggregation service 114 from various host web sites 102 are aggregated and provided, via an RSS module 120 output of the aggregation service 114, to the feed reader 106. For example, as a result, indications of the RSS feeds are caused to be displayed by the feed reader 106 as a portion of a syndication feed item page.

The RSS aggregator 114 (or, in some examples, functionality associated with the RSS aggregator 114, which may be a separate service) includes a filter 119 (more generally, a syndication feed adjuster) that is configurable (e.g., via a configurer 117) to keep at least some of the RSS feed 110 provided to the RSS aggregator 114 from being provided to the feed reader 106 via the RSS feed output 120. For example, in FIG. 1, while the syndication data feed 110 to the RSS aggregation service 114 includes item1, item2 and item3, the RSS syndication data feed 120 output from the RSS aggregation service 114 does not include item2. The web browser 106 may process the syndication data feed items 118 to request and receive, via a network such as the Internet 111, RSS-associated content that is web page content 104 of the host web site 102. For example, the RSS-associated content may be displayed by the web browser 107.

In one example, the configurer 117 may receive an alert signal 107 that indicates new syndication data feed items are included in the RSS feed 110 output from the RSS module 108. The alert signal 107 may be provided, for example, in response to a standard feature of syndication data feeds such as RSS that have the capability for notification that one or more syndication data feed items is new. The mechanism for delivering the alert signal may be, for example, an e-mail, an instant message and SMS text message, etc.

Using the configurer, a moderator may review the syndication data feed items 112 provided from the RSS syndication data feed output 108 of the host web site 104 to determine the suitability of providing that syndication data feed item from the RSS feed output 120 of the RSS aggregation service 114. For example, the filter 119 may operate based at least in part on a configuration table such as is shown in FIG. 2.

Figure 2:
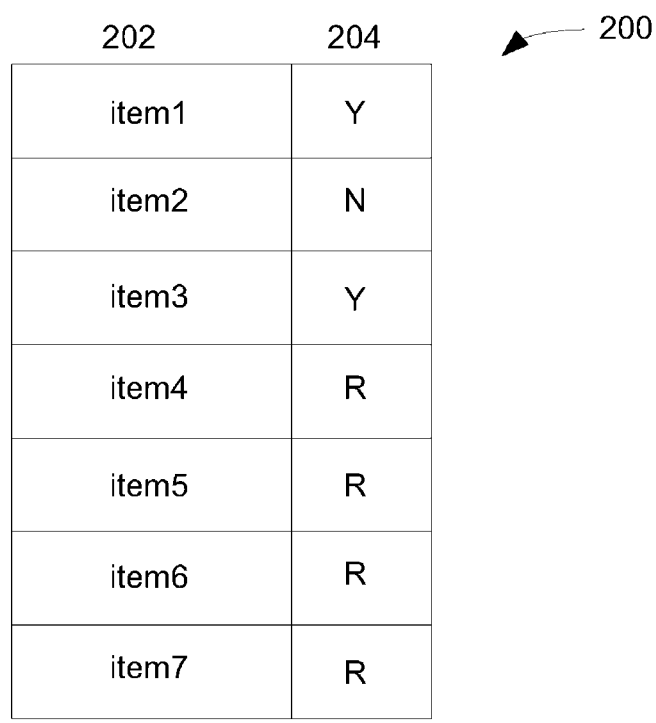
FIG. 2 illustrates an example configuration table usable by the filter of the FIG. 1 system.

Referring to the FIG. 2 example, each row of the filter configuration table 200 pertains to a different syndication feed data item provided from the RSS feed output 120 of the host web site 102. The first column 202 indicates the syndication feed data items. The second column 204 indicates how the filter 119 should treat each item with regard to providing that item from the RSS feed output 120 of the RSS aggregation service 114. In the FIG. 2 example, the indications in the second column 204 may be one of "Y", "N" and "R."

A "Y" indication indicates that the moderator has approved this item to be provided from the RSS feed output 120 of the RSS aggregation service 114. An "N" indication indicates that the moderator has disapproved this item to be provided from the RSS feed output 120 of the RSS aggregation service 114. Finally, an "R" indication indicates that the moderator has not yet indicated a determination as to whether to approve or disapprove this item.

In some examples, rather than having an overall yes or no indication for syndication feed items, the filter configuration table may include a yes or no indication for each of different users or groups of users. Furthermore, in some examples, the filter configuration table may include indications of ratings for the items. This may be similar, for example, to ratings provided for movies. Then, the filter may operate, for example, to provide different moderated feeds to different users, depending on characteristics (including preferences) of the users. For example, an adult user may receive all items whereas a child user may not receive items that are for violent or sexually explicit material. Using the teacher example mentioned above, the teacher/moderator may indicate the lowest grade level for which a particular item is deemed appropriate.

Figure 3:
FIG. 3 illustrates a "screen shot" of a user interface screen via which a user/moderator may interact with a filter configuration table.
Figure 4:
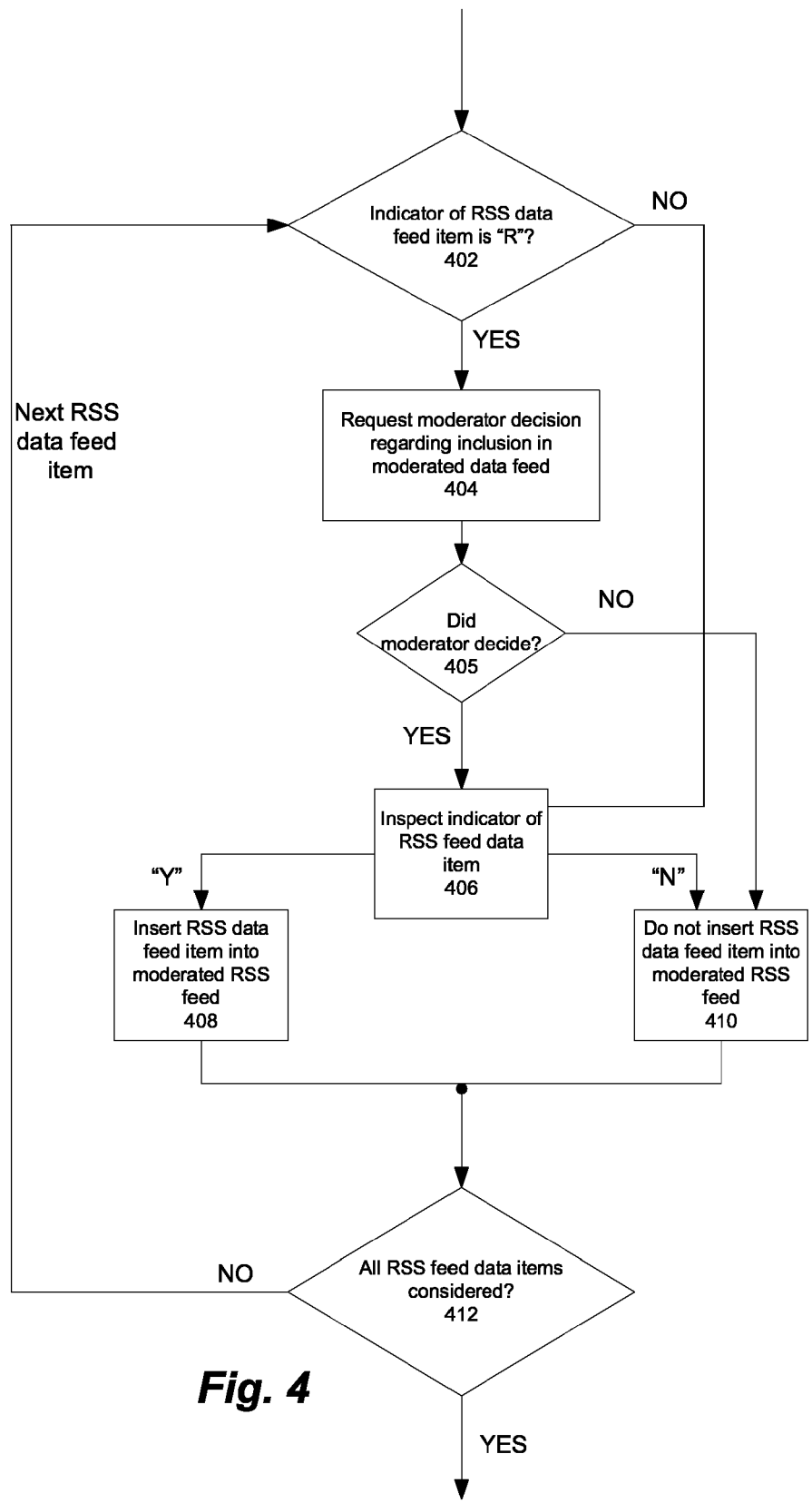
FIG. 4 is a flowchart that illustrates an example of processing, by the filter, of an example configuration table.

Using the FIG. 2 table 200 (or another configuration indication), the filter 119 determines how to treat each item in the RSS feed 110 output from the host web site 102. FIG. 4 is a flowchart that illustrates processing by the filter 119 of the FIG. 2 table 200 of the RSS data feed item indicators. First, FIG. 3 illustrates a "screen shot" of a user interface screen 300 via which a user/moderator may interact with a filter configuration table. While FIGS. 2, 3 and 4 specifically illustrate the example where the moderator makes a yes or no indication, these examples may be extended to operating according to indications of ratings.

In the FIG. 3 example, the user interface screen comprises the alert 107 signal (FIG. 1). In the FIG. 3 user interface screen 300, each row corresponds to a separate syndication data feed item (e.g., corresponds to a separate row in the filter configuration table, such as the filter configuration table 200 in the FIG. 2 example). The rows in the FIG. 3 example are grouped by host web site. In the FIG. 3 example, there are three such groups—for site1, site2 and site3.

Each of the sites has a "delete" user interface button associated with it to delete this site as one for which the aggregation service 114 receives a syndication data feed. In addition, each row (for an item) has associated with it a "radio" button in each of three columns—"Y," "N," and "R." In one example, the "R" radio button is initially set by default to correspond to the "R" indication discussed above relative to FIG. 2—"re-quires moderation." Furthermore, the moderator may also choose "Y" for "Yes, provide" or may choose "N" for "No, do not provide." These choices are employed to modify the filter configuration table, such as the filter configuration table 200 in FIG. 3. As discussed above, the filter configuration table may be consulted by the filter 119 to determine which syndication feed items of the syndication output 108 to provide from the syndication feed output 120 of the aggregation service 114.

In some examples, to interact with the filter configuration table, the moderator may be presented with a user interface similar to a feed reader user interface (or which may even be an enhanced "moderator version" of a feed reader). Thus, for example, the user interface may display all of the syndication feed items received by the aggregation service 114 for that moderator, but also indicate the moderation status of each syndication feed item. In some examples, the user interface presented to the moderator may display only those syndication feed items that require moderation.

In some examples, the feed items presented to the moderator are adjusted such that the locator of the item points to a moderation user interface such as the example illustrated in FIG. 3. The item, which activated, causes the moderation user interface to be displayed such that the moderator may interact with the filter configuration table. The displayed moderation user interface in this example may be, for example, for only a particular feed item for which the moderation user interface was activated or for all items being moderated.

In another example, the feed items presented to the moderator are adjusted such that, when activated, an intervention service may cause a moderation user interface to be displayed in conjunction with the actual hosted content (e.g., in a boundary portion of the display). Thus, for example, the moderation user interface may display a user interface item indicating a "thumbs up" and another user interface item indicating a "thumbs down," for a moderator to interact with the filter configuration table to indicate that the feed item is to be included or not included, respectively, in a syndication data feed presented to end users.

Co-pending patent application Ser. No. 11/611,648 entitled INTERVENTION PROCESSING OF REQUESTS RELATIVE TO SYNDICATION DATA FEED ITEMS, and filed concurrently herewith, provides details of adjusting feed items and operation of an intervention service. Co-pending patent application Ser. No. 11/611,648 is incorporated herein by reference in its entirety for all purposes.

It is noted that other methods for a moderator to interact with the filter configuration table may be provided. For example, the feed may be moderated by SMS or some other communication mechanism, such as e-mail. This may be particularly useful when a "moderation required signal" (such as the alert signal 107 in FIG. 1) is provided to the moderator via such a mechanism, and the moderator may interact with the filter configuration table by the same mechanism (e.g., responding to an SMS message, e-mail or instant message with a "Y" or "N" SMS message or e-mail).

In some examples, a configurer (such as the configurer 117 in FIG. 1) operates automatically, as a classifier such as a Bayesian classifier, according to an initial configuration (which may be, for example, training). The initial configuration may be provided, for example, manually by a moderator or the moderation may be initially configured with an initial configuration (such as, for example, a "trained" configuration). In addition, the moderator may override a moderation decision made by the classifier, which may be used to retrain the classifier for subsequent classifications.

We now discuss the FIG. 4 example of processing a filter configuration table. Referring to FIG. 4, at step 402, it is determined whether the indicator for an item is an "R." If the indicator is an "R," then it is requested (at step 404) that the moderator decide whether to include the item in the moderated data feed 120. At step 405, it is determined if the moderator decide (e.g., after waiting a period of time).

If the moderator decided, then processing continues at step 406. In addition, if it is determined at step 402 that the indicator for the item is not an "R," then processing also continues at step 406. At step 406, the indicator of the RSS feed data item is inspected. If the indicator of the RSS feed data item is "Y," then (at step 408) the RSS data feed item is caused to be inserted into the moderated RSS feed. If the indicator of the RSS feed data item is "N," then (at step 410), the RSS data feed is not inserted into the moderated RSS feed.

At step 412, it is determined if all RSS data feed items have been considered. If not, then processing returns to step 402 with the next RSS data feed item. Otherwise, the processing of FIG. 4 ends.

We have described how a syndication data feed being presented to a feed reader may be filtered (e.g., based on a user-provided configuration) to "moderate" the items of the feed to be presented to a user. It is noted that the described methods may be carried out by at least one computing device executing computer program instructions that are stored in at least one computer readable medium.

What is claimed is:

1. A method to process a syndication data feed, comprising:
   receiving a configuration by a syndication data feed aggregation service, wherein the configuration is received via a user interface from a moderator, wherein the configuration pertains to a plurality of syndication data items of an input syndication data feed, the configuration specifying which one or more particular input syndication data items of the plurality of syndication data items of the input syndication data feed are not to be provided by the syndication data feed aggregation service to a plurality of feed readers, wherein the configuration for one or more of the plurality of syndication data feed items indicates that the moderator will later specify syndication data moderation indications indicating whether to provide or not provide the corresponding syndication data items to the plurality of feed readers;
   after the configuration is received, receiving at the syndication data feed aggregation service, the input syndication data feed, which include one or more of the particular input syndication data items;
   based on the configuration, filtering at the syndication data feed aggregation service the received input syndication feed's one or more particular input syndication data items so as to not be provided to the plurality of feed readers; and
   providing an output syndication data feed that includes the input syndication data feed without the one or more particular input syndication data items by the syndication data feed aggregation service to the plurality of feed readers, wherein the output syndication data feed is provided to end users in response to requests for the input syndication feed;
   wherein the moderator is independent from the end users that have requested the input syndication data feed;
   presenting the user interface identifying the plurality of syndication data items, wherein for each of the plurality of syndication data items, the user interface includes a set of options selectable by the moderator, wherein the set of options includes a first option, a second option, and a third option;
   wherein the first option indicates that the corresponding one of the plurality of syndication data items of the input syndication data feed is not to be provided by the syndication data feed aggregation service to the plurality of feed readers;
   wherein the second option indicates that the corresponding one of the plurality of syndication data items of the input syndication data feed is to be provided by the syndication data feed aggregation service to the plurality of feed readers;
   wherein the third option indicates that the moderator will later specify a syndication data moderation indication indicating whether to provide or not provide the corresponding one of the plurality of syndication data items to the plurality of feed readers.

2. The method of claim 1, wherein:
   the configuration is provided according to a classification algorithm.

3. The method of claim 2, further comprising:
   training the classification algorithm.

4. The method of claim 2, further comprising:
   receiving signals that have been input by a moderator indicating an override of parameters of the classification algorithm.

5. The method of claim 2, further comprising:
   receiving signals that have been input by a moderator indicating an override of parameters of the classification algorithm; and
   adjusting the parameters of the classification algorithm based on the override indicating signals.

6. The method of claim 1, wherein:
   the configuration includes ratings indications for the input syndication data items, wherein the ratings indications are at an item resolution to indicate, individually a rating for each of the input syndication data items; and
   the filtering also includes processing the ratings indication of each of the input syndication data items in view of characteristics of one or more users to whom the input syndication data item may be provided.

7. The method of claim 1, wherein the configuration is provided by a moderator in response to an alert signal that is provided to the moderator by a communication mechanism other than an HTTP communication mechanism.

8. The method of claim 7, wherein:
   the communication mechanism by which the alert signal is provided includes at least one of the group consisting of SMS and e-mail.

9. The method of claim 1, further comprising:
   receiving the syndication data moderation indications by other than an HTTP communication mechanism.

10. The method of claim 1, further comprising:
    receiving the syndication data moderation indications by one of the group consisting of SMS and e-mail.

11. The method of claim 1, wherein filtering includes determining at least one input syndication data item for which no syndication feed moderation indication has been received, at an item resolution of the input syndication data feed.

12. The method of claim 1, wherein the configuration is further provided for a plurality of additional syndication data feeds, and wherein:
    the input syndication data feed is a first input syndication data feed; and
    the receiving step includes receiving the plurality of additional syndication data feeds, each including a plurality of input syndication feed items that includes at least one of the particular input syndication feed items, the filtering step includes filtering at least one of the particular input syndication feed items of the additional syndication data feeds based upon the configuration, and the providing step includes providing as additional output syndication feeds the additional syndication feeds without their filtered at least one particular input syndication feed items to a plurality of feed readers.

13. A computer program product, the computer program product comprising at least one non-transitory computer-readable medium having computer program instructions stored therein which are operable to cause at least one computing device to:

receive a configuration by a syndication data feed aggregation service, wherein the configuration is received via a user interface from a moderator, wherein the configuration pertains to a plurality of syndication data items of an input syndication data feed, the configuration specifying which one or more particular input syndication data items of the plurality of syndication data items of the input syndication data feed are not to be provided by the syndication data feed aggregation service to a plurality of feed readers, wherein the configuration for one or more of the plurality of syndication data feed items indicates that the moderator will later specify syndication data moderation indications indicating whether to provide or not provide the corresponding syndication data items to the plurality of feed readers;

after the configuration is received, receiving at the syndication data feed aggregation service, the input syndication data feed, which include one or more of the particular input syndication data items;

based on the configuration, filtering at the syndication data feed aggregation service the received input syndication feed's one or more particular input syndication data items so as to not be provided to the plurality of feed readers; and provide an output syndication data feed that includes the input syndication data feed without the one or more particular input syndication data items by the syndication data feed aggregation service to the plurality of feed readers, wherein the output syndication data feed is provided to end users in response to requests for the input syndication feed;

wherein the moderator is independent from the end users that have requested the input syndication data feed;

presenting the user interface identifying the plurality of syndication data items, wherein for each of the plurality of syndication data items, the user interface includes a set of options selectable by the moderator, wherein the set of options includes a first option, a second option, and a third option;

wherein the first option indicates that the corresponding one of the plurality of syndication data items of the input syndication data feed is not to be provided by the syndication data feed aggregation service to the plurality of feed readers;

wherein the second option indicates that the corresponding one of the plurality of syndication data items of the input syndication data feed is to be provided by the syndication data feed aggregation service to the plurality of feed readers;

wherein the third option indicates that the moderator will later specify a syndication data moderation indication indicating whether to provide or not provide the corresponding one of the plurality of syndication data items to the plurality of feed readers.

14. The computer program product of claim 13, wherein:
the configuration is provided according to a classification algorithm.

15. The computer program product of claim 14, wherein the computer program instructions are further operable to cause the at least one computing device to:
train the classification algorithm.

16. The computer program product of claim 14, wherein the computer program instructions are further operable to cause the at least one computing device to:
receive signals that have been input by a moderator indicating an override of parameters of the classification algorithm.

17. The computer program product of claim 14, wherein the computer program instructions are further operable to cause the at least one computing device to:
receive signals that have been input by a moderator indicating an override of parameters of the classification algorithm; and
adjust the parameters of the classification algorithm based on the override indicating signals.

18. The computer program product of claim 13, wherein:
the configuration includes ratings indications for the input syndication data items, wherein the ratings indications are at an item resolution to indicate, individually a rating for each of the input syndication data items; and
the filtering computer program instruction include computer program instructions operable to cause the at least one computing device to process the ratings indication of each of the syndication data items in view of characteristics of one or more users to whom that input syndication data item may be provided.

19. The computer program product of claim 13, wherein the configuration is provided in response to an alert signal that is provided to the moderator by a communication mechanism other than an HTTP communication mechanism.

20. The computer program product of claim 19, wherein:
the communication mechanism by which the alert signal is provided includes at least one of the group consisting of SMS and e-mail.

21. The computer program product of claim 13, wherein:
the syndication data moderation indications are received by other than an HTTP communication mechanism.

22. The computer program product of claim 13, wherein:
the syndication data moderation indications are received by one of the group consisting of SMS and e-mail.

23. The computer program product of claim 13, wherein filtering includes determining at least one input syndication data item for which no syndication feed moderation indication has been received, at an item resolution of the input syndication data feed.

24. The computer program product of claim 13, wherein the configuration is further provided for a plurality of additional syndication data feeds, and wherein:
the input syndication data feed is a first input syndication data feed; and
the receiving step includes receiving the plurality of additional syndication data feeds, each including a plurality of input syndication feed items that includes at least one of the particular input syndication feed items,
the filtering step includes filtering at least one of the particular input syndication feed items of the additional syndication data feeds based upon the configuration, and
the providing step includes providing as additional output syndication feeds the additional syndication feeds without their filtered at least one particular input syndication feed items to a plurality of feed readers.

25. A syndication data feed moderator service to process a syndication data feed to generate an adjusted syndication data feed, the service comprising at least one computing device configured to:

receive a configuration by a syndication data feed aggregation service, wherein the configuration is received via a user interface from a moderator, wherein the configuration pertains to a plurality of syndication data items of an input syndication data feed, the configuration specifying which one or more particular input syndication data items of the plurality of syndication data items of the input syndication data feed are not to be provided by the syndication data feed aggregation service to a plurality of feed readers, wherein the configuration for one or more of the plurality of syndication data feed items indicates that the moderator will later specify syndication data moderation indications indicating whether to provide or not provide the corresponding syndication data items to the plurality of feed readers;

after the configuration is received, receiving at the syndication data feed aggregation service, the input syndication data feed, which include one or more of the particular input syndication data items;

based on the configuration, filtering at the syndication data feed aggregation service the received input syndication feed's one or more particular input syndication data items so as to not be provided to the plurality of feed readers; and provide an output syndication data feed that includes the input syndication data feed without the one or more particular input syndication data items by the syndication data feed aggregation service to the plurality of feed readers, wherein the output syndication data feed is provided to end users in response to requests for the input syndication feed;

wherein the moderator is independent from the end users that have requested the input syndication data feed;

presenting the user interface identifying the plurality of syndication data items, wherein for each of the plurality of syndication data items, the user interface includes a set of options selectable by the moderator, wherein the set of options includes a first option, a second option, and a third option;

wherein the first option indicates that the corresponding one of the plurality of syndication data items of the input syndication data feed is not to be provided by the syndication data feed aggregation service to the plurality of feed readers;

wherein the second option indicates that the corresponding one of the plurality of syndication data items of the input syndication data feed is to be provided by the syndication data feed aggregation service to the plurality of feed readers;

wherein the third option indicates that the moderator will later specify a syndication data moderation indication indicating whether to provide or not provide the corresponding one of the plurality of syndication data items to the plurality of feed readers.

26. The service of claim 25, wherein:
the configuration is provided according to a classification algorithm.

27. The service of claim 26, wherein:
the at least one computing device is further configured to train the classification algorithm.

28. The service of claim 26, wherein:
the at least one computing device is further configured to receive signals that have been input by a user indicating an override of parameters of the classification algorithm.

29. The service of claim 26, wherein the at least one computing device is further configured to:
receive signals that have been input by a moderator indicating an override of parameters of the classification algorithm; and
adjust the parameters of the classification algorithm based on the override indicating signals.

30. The service of claim 25, wherein:
the configuration includes ratings indications for the input syndication feed items, wherein the ratings indications are at an item resolution to indicate, individually a rating for each of the plurality of input syndication data items; and
the filtering also includes processing the ratings indication of each of the plurality of input syndication data items in view of characteristics of one or more users to whom that input syndication feed item may be provided.

31. The service of claim 25, wherein one or more of the syndication data moderation indications are provided in response to an alert signal that is provided to the moderator by a communication mechanism other than an HTTP communication mechanism.

32. The service of claim 31, wherein:
the communication mechanism by which the alert signal is provided includes at least one of the group consisting of SMS and e-mail.

33. The service of claim 25, wherein:
the at least one computing device is configured to cause the at least one computing device to provide the configuration, at an item resolution of the input syndication data feed, based on received syndication data moderation indications.

34. The service of claim 25, wherein:
the at least one computing device is configured such that the syndication data moderation indications are received by other than an HTTP communication mechanism.

35. The service of claim 25, wherein:
the at least one computing device is configured such that the syndication data moderation indications are received by one of the group consisting of SMS and e-mail.

36. The syndication data feed moderator service of claim 25, wherein filtering includes determining at least one of the plurality of input syndication data items for which no syndication feed moderation indication has been received, at an item resolution of the input syndication data feed.

37. The syndication data feed moderator service of claim 25, wherein the configuration is further provided for a plurality of additional syndication data feeds, and wherein:
the input syndication data feed is a first input syndication data feed;
the at least one computing device is further configured to receive the plurality of additional syndication data feeds, each including a plurality of input syndication feed items that includes at least one of the particular input syndication feed items,
the at least one computing device is further configured to filter at least one of the particular input syndication feed items of the additional syndication data feeds based upon the configuration, and
the at least one computing device is further configured to provide as additional output syndication feeds the additional syndication feeds without their filtered at least one particular input syndication feed items to a plurality of feed readers.

38. The method as recited in claim 1, wherein the configuration is specified manually by the moderator.

39. The method as recited in claim 1, wherein the configuration is applicable to a plurality of users.

40. The method as recited in claim 1, wherein the configuration for one or more of the plurality of syndication data feed items indicates that the corresponding one of the plurality of syndication data feed items is to be provided by the syndication data feed aggregation service or is not to be provided by the syndication data feed aggregation service.

41. The syndication data feed moderator service as recited in claim 25, wherein the end users have subscribed to the input syndication data feed but have not subscribed to the output syndication data feed.

42. The method as recited in claim 1, further comprising:
presenting via a moderation interface at least one of the one or more of the plurality of syndication data feed items for which the configuration received from the moderator indicates that the moderator has not yet specified a syndication data moderation indication as to whether to provide or not provide the corresponding syndication data feed items to the plurality of feed readers; and
receiving from the moderator a syndication data moderation indication indicating whether to provide or not provide the at least one of the one or more of the plurality of syndication data feed items to the plurality of feed readers.

43. The method as recited in claim 42, wherein presenting comprises:
displaying only the one or more of the plurality of syndication data feed items for which the configuration received from the moderator indicates that the moderator has not yet specified a syndication data moderation indication indicating whether to provide or not provide the corresponding syndication data feed items to the plurality of feed readers.

44. The method as recited in claim 1, further comprising:
presenting a moderation interface, wherein the moderation interface indicates the configuration for each of the plurality of syndication data feed items.

45. The method as recited in claim 44, wherein the configuration for a first set of the plurality of syndication data feed items indicates that the first set of the plurality of syndication data feed items is to be provided to the plurality of feed readers, wherein the configuration for a second set of the plurality of syndication data feed items indicates that the second set of the plurality of syndication data feed items is not to be provided to the plurality of feed readers, and wherein the configuration for a third set of the plurality of syndication data feed items indicates that the moderator will specify a syndication data moderation indication indicating whether to provide or not provide the corresponding syndication data feed items to the plurality of feed readers after the moderator has reviewed content of the corresponding syndication data feed items.

46. A syndication data feed moderator service to process a syndication data feed to generate an adjusted syndication data feed, the service comprising at least one computing device configured to:
receive a configuration at a syndication data feed aggregation service from a moderator, the configuration pertaining to a plurality of syndication data feed items of the input syndication data feed, the configuration specifying which one or more particular input syndication data items of the plurality of syndication data items of the input syndication data feed are not to be provided by the syndication data feed aggregation service to a plurality of feed readers, wherein syndication data moderation indications indicating whether to provide or not provide one or more syndication data feed items of input syndication data feed to the plurality of feed readers are received from the moderator via other than an HTTP communication mechanism;
after the configuration is received, receive at the syndication data feed aggregation service, the input syndication data feed including the plurality of input syndication data items, which include one or more of the particular input syndication data items;
based on the configuration, filter at the syndication data feed aggregation service the received input syndication feed's one or more particular input syndication data items so as to not be provided to the plurality of feed readers; and
provide an output syndication data feed that includes the input syndication data feed without the one or more particular input syndication data items by the syndication data feed aggregation service to the plurality of feed readers, wherein the output syndication data feed is provided to end users in response to requests for the input syndication feed;
wherein the moderator is independent from the end users that have requested the input syndication data feed;
presenting the user interface identifying the plurality of syndication data items, wherein for each of the plurality of syndication data items, the user interface includes a set of options selectable by the moderator, wherein the set of options includes a first option, a second option, and a third option;
wherein the first option indicates that the corresponding one of the plurality of syndication data items of the input syndication data feed is not to be provided by the syndication data feed aggregation service to the plurality of feed readers;
wherein the second option indicates that the corresponding one of the plurality of syndication data items of the input syndication data feed is to be provided by the syndication data feed aggregation service to the plurality of feed readers;
wherein the third option indicates that the moderator will later specify a syndication data moderation indication indicating whether to provide or not provide the corresponding one of the plurality of syndication data items to the plurality of feed readers.

47. The syndication data feed moderator service as recited in claim 46, wherein the syndication data moderation indications are received by one of the group consisting of SMS and e-mail.

48. The method as recited in claim 1, further comprising:
receiving a selection of the third option for one or more of the plurality of syndication data items, the selection of the third option for the one or more of the plurality of syndication data items indicating that the moderator will later specify syndication data moderation indications indicating whether to provide or not provide the corresponding one or more of the plurality of syndication data items to the plurality of feed readers.

49. The method as recited in claim 48, further comprising:
presenting at least one of the one or more of the plurality of syndication data items for which the third option was selected by the moderator; and receiving input from the moderator specifying the syndication data moderation indication indicating whether to provide or not provide the corresponding one of the one or more of the plurality of syndication data items to the plurality of feed readers.

50. The method as recited in claim 48, further comprising: receiving input from the moderator specifying the syndication data moderation indication indicating whether to provide or not provide the corresponding one of the one or more of the plurality of syndication data items to the plurality of feed readers.

51. The method as recited in claim 50, wherein the input is received via SMS or email.

52. The method as recited in claim 42, wherein the moderation interface is presented in conjunction with hosted content of the at least one of the one or more of the plurality of syndication data feed items.

53. The method as recited in claim 1, wherein the configuration indicates that the moderator will specify a syndication data moderation indication indicating whether to provide or not provide the corresponding syndication data feed items to the plurality of feed readers after the moderator has reviewed content of the corresponding syndication data feed items.

* * * * *